US009656766B2

(12) United States Patent
Friedrich

(10) Patent No.: US 9,656,766 B2
(45) Date of Patent: *May 23, 2017

(54) TRACK TRANSPORT SYSTEM FOR LOADING AND UNLOADING AN AIRPLANE GALLEY

(71) Applicant: Dr. Meyer-Dulheuer Patentanwälte Consulting & Services GmbH, Frankfurt am Main (DE)

(72) Inventor: Detlef Henry Friedrich, Frankfurt am Main (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/070,121

(22) Filed: Mar. 15, 2016

(65) Prior Publication Data
US 2016/0257425 A1    Sep. 8, 2016

Related U.S. Application Data

(63) Continuation of application No. 13/825,041, filed as application No. PCT/EP2011/065083 on Sep. 1, 2011.

(30) Foreign Application Priority Data

Oct. 13, 2010 (DE) .................. 10 2010 048 194
Aug. 8, 2011 (DE) .................. 10 2011 052 497

(51) Int. Cl.
| *B64F 1/32* | (2006.01) |
| *B64D 11/00* | (2006.01) |
| *B64D 11/04* | (2006.01) |
| *B66B 9/193* | (2006.01) |
| *B65G 67/00* | (2006.01) |

(52) U.S. Cl.
CPC ............ *B64F 1/32* (2013.01); *B64D 11/0007* (2013.01); *B64D 11/04* (2013.01); *B65G 67/00* (2013.01); *B66B 9/193* (2013.01)

(58) Field of Classification Search
CPC .. B66B 9/193; B66B 9/08; B66B 9/16; B66B 9/0846; B66B 9/0853; B64D 11/007; B64D 11/04; B64F 1/32
USPC ......... 187/245, 200, 201, 242; 182/102, 103
See application file for complete search history.

(56) References Cited

U.S. PATENT DOCUMENTS

| 2,846,092 A * | 8/1958 | Garnett ..................... B64F 1/32 414/341 |
| 3,891,062 A * | 6/1975 | Geneste .................... B66B 9/16 182/103 |
| 4,183,423 A * | 1/1980 | Lewis ....................... E06C 7/12 182/103 |

(Continued)

*Primary Examiner* — Michael Riegelman
(74) *Attorney, Agent, or Firm* — Roger D. Emerson; Emerson Thomson Bennett, LLC

(57) ABSTRACT

A rail transport system comprising at least two runners having a shaped profile, a transport rail, and a transport carriage, the runners with a shaped profile being extended over a staircase or over a flat section and the transport carriage being moved along the transport rail. The transport carriage is provided with at least one electric motor. The runners having a shaped profile and the transport rail are stored in the transport carriage. A method for constructing a rail transport system and for transporting at least one container for loading or unloading the galley of an airplane, and a system for simultaneously loading and/or unloading the galley of an airplane.

4 Claims, 7 Drawing Sheets

(56) References Cited

U.S. PATENT DOCUMENTS

| | | | | |
|---|---|---|---|---|
| 4,546,854 A * | 10/1985 | Bocker | ................... | B66B 9/16 182/103 |
| 4,706,779 A * | 11/1987 | Bono | ...................... | B66B 9/16 182/103 |
| 4,793,437 A * | 12/1988 | Hanthorn | ................ | B66B 9/16 182/102 |
| 5,083,727 A * | 1/1992 | Pompei | ............. | B64D 11/0007 105/345 |
| 5,476,156 A * | 12/1995 | Gerber | ................... | B66B 9/193 187/201 |
| 5,489,181 A * | 2/1996 | Greaves | .................. | B64F 1/30 414/398 |
| 7,424,932 B1 * | 9/2008 | Murphy | ................. | E06C 1/345 182/103 |
| 8,002,512 B1 * | 8/2011 | Blehm | ................... | B66B 9/193 182/103 |

\* cited by examiner

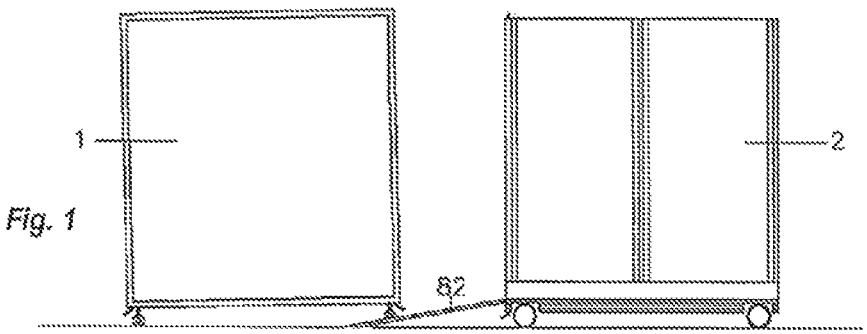
Fig. 1
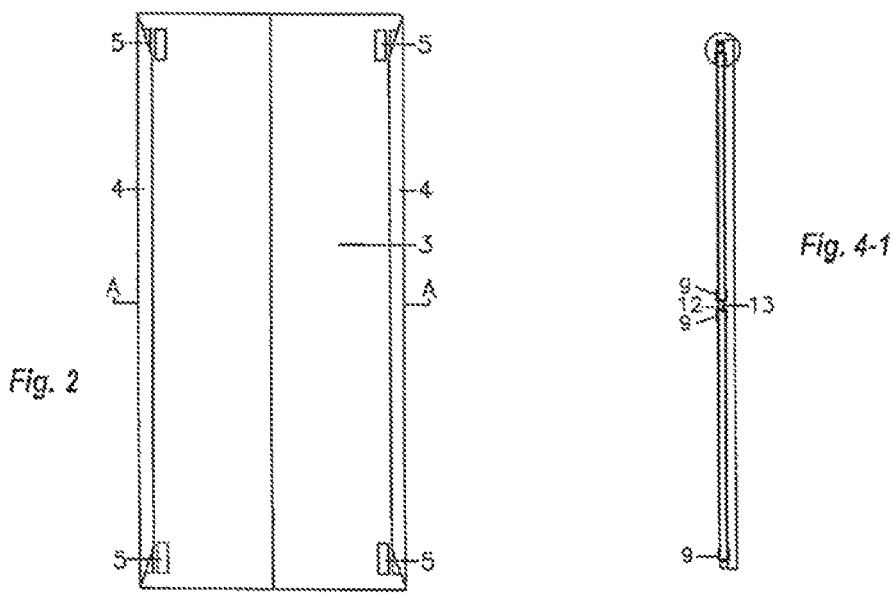
Fig. 2
Fig. 4-1
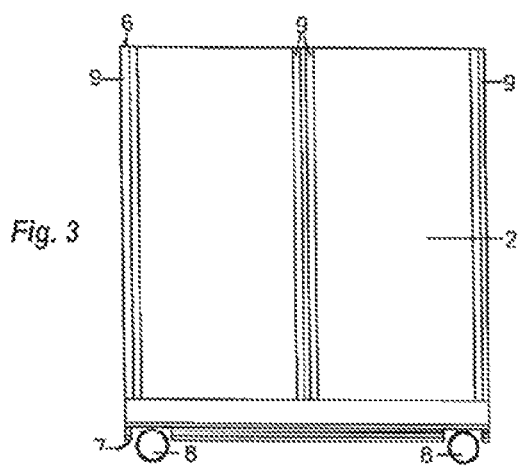
Fig. 3
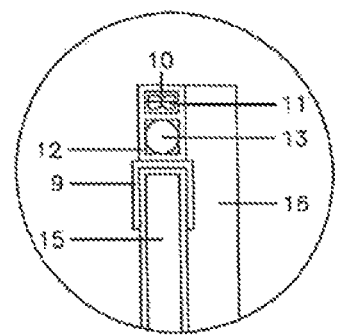
Fig. 4-2

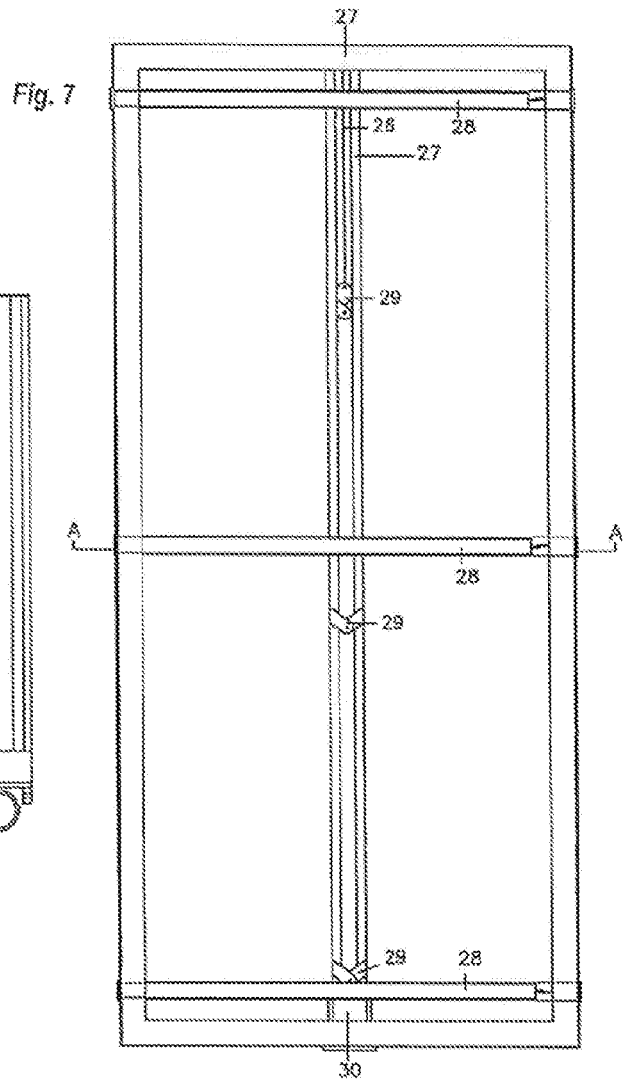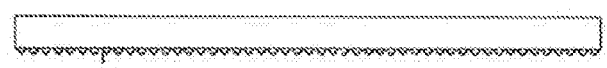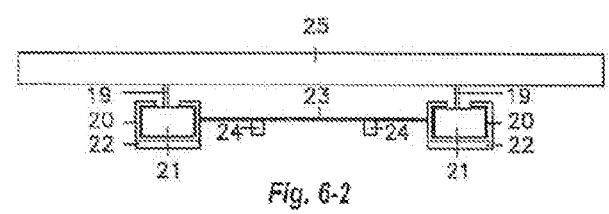

TRACK TRANSPORT SYSTEM FOR LOADING AND UNLOADING AN AIRPLANE GALLEY

CROSS REFERENCE TO RELATED APPLICATIONS

This application claims priority to and is a continuation of U.S. Ser. No. 13/825,041, filed Mar. 19, 2013, which is the U.S. national stage entry of PCT application PCT/EP2011/065083 filed Sep. 1, 2011 and which also claims priority to German patent application 102011052497.5 filed Aug. 8, 2011 and German patent application 102010048194.7 filed Oct. 12, 2010 all of which are fully incorporated herein by reference.

TECHNICAL FIELD

The invention relates to a track transport system, particularly a track transport system for loading and unloading an airplane galley.

BACKGROUND

An airplane is unloaded upon arrival at the airport, or loaded before departure from the airport. Trucks or lift trucks are used to carry out these processes. Hydraulics with a shear system are incorporated in the chassis underneath the truck or lift truck box. The truck or lift truck is provided with a hydraulic actuator and a shear mechanism that can lift or lower the entire truck/lift truck box including the load contained therein to and from the corresponding door in the aircraft.

Modern aircrafts, for example, of the types Boeing 747, 757, 787 as well as Airbus A 340-600 and A380, have multiple-story cabins, including a cargo hold and a passenger cabin. The cargo hold includes a hatch or door in the fuselage that can be opened and closed for loading and unloading. The passenger cabin is located directly above or below the cargo hold, and a galley is provided in the passenger cabin. The aircraft has an elevator for conveying pieces of freight via the cargo loading hatch into the cargo hold under the passenger cabin and for the return transport of previously transported freight from the passenger cabin down into the cargo hold. The elevator transports a plurality of carriages or trolleys loaded by the trucks or lift trucks, from the cargo hold to the galley in the passenger cabin to supply the onboard aircraft kitchen. Empty carriages are returned by the elevator from the onboard kitchen to the cargo hold, then to the truck or lift truck. The carriages are thus moved between the outside of the aircraft and the passenger cabin.

A fully loaded galley contains all the provisions that the flight attendants and passengers will need or may need for the duration of the flight. This does not only include food items but other goods as well, such as, for example, diapers, security devices, etc. If the elevator for transporting the carriages is inoperative, the carriages cannot be conveyed between the two aircraft cabin levels. Loading the galley in the passenger cabin is therefore no longer possible. The aircraft, however, is not allowed to leave the gate until the elevator has been repaired, thus resulting in longer boarding times. If the departure of the flight has to be postponed until the following day, passengers must be checked into a hotel, thus reducing sales revenues for the airline. In addition, frequent arrival and departure delays cause customer dissatisfaction.

The object of the present invention therefore is to provide a substitute solution that can be used in all aircraft models for the elevator that handles the loading and unloading of the galley. This object is achieved by a track transport system provided with the following components when the track transport system is not fixedly installed in the staircase area of the aircraft according to the invention for transportation operations over any kind of steps intended to supply the respective galley and/or cabin areas in the aircraft as a track transport system with a cart-in-cart system, two profiled rails that can be extended over a staircase or a flat section and that include a plurality of foldable or telescoping rail sections and at least one electric motor;

a transport rail having at least one electric motor and a plurality of foldable or telescoping rail sections; and a transport carriage that is moved on the transport rail, in which the profiled rails and the transport rail are stored, and that is provided with at least one electric motor.

The track transport system can be installed on a staircase in an aircraft or as a mobile elevator substitute for use with all aircraft types for any and all transports, when items are conveyed up or down inside an aircraft cabin, on any type of staircase, the railing of the staircase being used as well.

This track transport system is especially advantageous for use in connection with conveying one or a plurality of containers for the loading and/or unloading of a galley of an aircraft.

Before and after use, the transport carriage is used to store the transport rail. Like a trolley, it is placed in an empty stowing space of the galley and can be used for loading and unloading the galley in the event of a complete elevator failure.

Different airlines have different container types with different dimensions, sizes and designations. A long trolley has a width of 41 cm, a height of 105 cm and a length of 92 cm. A half trolley has a width of 41 cm, a height of 105 cm and a length of 45 cm. A container has a width of 41 cm, a height of 105 cm and a length of 45 cm. The transport carriage can be widened or narrowed on both sides, together at a maximum of 2.5 cm, to the width of a trolley. This creates the possibility of taking the transport carriage with stowed transport rail along, as an onboard feature.

Regarding the staircases between two aircraft levels, on the Boeing aircraft models 747-400, this is a straight staircase with the galley on the upper level. On the Airbus aircraft model A 380, the staircase is a spiral staircase between two aircraft levels with the galley located on the upper level. On the aircraft model Airbus A 340-00, the staircase between two levels of the aircraft is a straight staircase with the galley on the lower level.

Connecting rails can preferably be installed laterally on the rail sections of the transport rail that support the folding and unfolding operation of the rail sections or the retraction and extension of the rail sections.

On a transport rail that is made of a plurality of rail sections, two adjoining rail sections are preferably connected by a pivot joint that makes it possible to fold the transport rail together. On a telescopic transport rail that is made of a plurality of rail sections, preferably, the transport rail has a telescopic device that is operated by the electric motor. The rail sections are connected to each other in a telescopic fashion, and the telescopic device is able to push the transport rails out of the transport carriage, section by section, using a gear mechanism.

The track transport system according to the invention can also be used with forward loading and reverse unloading of lift truck boxes. With forward loading, the containers are pushed into the transport carriage ("cart-in-cart" system). The transport carriage reaches the truck/lift truck via the transport rail. Forward loading can occur by way of the track system directly from the production, commissioning and providing areas into the truck/lift truck box. The containers are set up in the lift truck and the parking brakes of the containers are secured in place. With reverse unloading, the containers are pushed into the transport carriage. The transport carriage is conveyed along the transport rail to the area of the return ramp. The containers are removed at the return ramp, sorted and made available for further processes.

The present track transport system is also able to transport the containers through the passenger corridors. Some airlines, in fear that the seats of the aircraft may get damaged, do not allow pushing containers along passenger corridors. The track transport system according to the invention ensures safe transport to the galley without damage to any seats.

In a shaped-profile foldable rail made up of a plurality of rail sections, neighboring rail sections are preferably connected to each other also by a pivot joint, and the rail having the shaped profile can be folded together. On a telescopic profiled rail made up of a plurality of rail sections, the rail preferably also includes a telescopic device powered by an electric motor. The rail sections are telescopically connected to each other; and the telescopic device is able to push the rail out of the transport carriage, section by section, utilizing a gear mechanism.

The transport carriage is also provided with a power cable and a plug that can be connected to an outlet on the aircraft, the power cable being housed together with the plug inside a trip-safe rail. The power connection on any aircraft is 115V. The electric motors of the transport carriage, the profiled rails and the transport rail are started by push-button activation on the transport carriage.

The electric motor in the transport carriage and the electric motor in the transport rail can each be operated by a rechargeable battery, if power is lost or the aircraft does not have a suitable power source. The rechargeable battery can be charged by the alternator on the truck/lift truck or by the onboard power supply during use.

When the transport rail must be set up on a staircase, the transport carriage is moved to the bottom step of the staircase. The transport carriage has a foot-operated lever that activates the parking brake of the wheels on the transport carriage.

After the transport carriage has been positioned and the electric motors started, the profiled rails are extended up the staircase. On the bottom of each of the two rails there is a respective toothed rail, and the gears rotate therebelow. The gears are mounted in the transport carriage, are powered by the electric motor, and are connected to a toothed belt. The individual foldable and/or telescopic rail sections are moved inside the transport carriage by the gears below the toothed rails that are mounted on the bottom side of the rail sections. The two profiled rails are moved upward on the edges of the staircase at an angle that is larger than the angle of ascent of the staircase; at the end of the setup process, they are able to rest on the staircase. A plurality of connecting bars are provided between the two profiled rails so that the profiled rails come to rest parallel relative to the side edges of the staircase, thus providing additional stability for the transport rail. The connecting bars are each provided in the center with at least one L-shaped angle that comes to rest against the edges of the staircase on installation of the rail track.

Preferably, a plurality of spacers are installed on the side of the staircase of the rail track having a shaped profile.

The transport rail lies on top of the profiled rail. The transport carriage moves along the transport rail. A plurality of casters, inter alia, can be mounted on the bottom side of the transport rail that moves inside the profiled rails during setting up of the transport rail.

The individual foldable rail sections and/or telescopic rail sections are moved by the gears below the toothed rail that are mounted on the bottom of the rail sections.

Advantageously, the transport rail is also provided with metal springs, air springs or gas springs on the bottom edges of the sections and/or sections that ensure slow lowering of the transport rail onto the edges of the staircase.

A door having a ramp-type function for loading and unloading the containers is fastened by a hinge on the top rail section. The bottom rail section or the rail section is provided with a cross-bar such that a lever mechanism is triggered simultaneously when the spring legs, which prevent slipping on the carpeted steps and ensure additional stationary stability of the transport rail, make contact with the steps. The transport rail is preferably provided at both ends with one or a plurality of fasteners for mounting the rail on the top landing of the staircase and the bottom landing of the staircase.

The transport rail of the track transport system according to the invention is provided with an integrated sliding frame. The integrated sliding frame is made of a light alloy, such as, for example, aluminum, and moves on the transport rail. The sliding frame includes at least one glide plate and one transport plate. The glide plate and the transport plate are connected to a hinge and can be folded together. A plurality of casters is provided below the slide plate that ensures low-friction back and forth sliding action of the transport rail. Upon ending the total loading and/or unloading process, the sliding frame moves automatically to the upper part of the transport rail.

The transport plate conveys the transport carriage ("cart-in-cart" system) and is able to convey a weight of at least 150 kg. The transport plate is moved at an obtuse angle that is larger than 90E relative to the loading and unloading planes. Security rails are installed to the left and right of the transport plate that define the obtuse angle when the two glide plates are unfolded. The transport plate is inserted into a slot at the bottom in the transport carriage. T-pins are mounted on the transport plate that can be locked using a locking mechanism in the transport carriage, thereby achieving a securely fastened connection of the transport carriage with the containers.

Preferably, a plurality of planes exist in the rail sections or rail sections that are provided with dividers made of light plastic plates, with a gear mechanism, one or a plurality of toothed belts and one or a plurality of flat or tubular motors in the planes of the rail sections or rail sections, and square light alloy linkages or bar-type linkages installed in the different planes.

The transport carriage is able to convey a minimum container weight of 150 kg and a maximum weight of 200 kg. An advantage of the track transport system according to the invention lies in the fact that the gross weight of the transport carriage is distributed over the transport rail.

The width of the transport rail is smaller than the width of the transport carriage with underbody.

The transport carriage of the track transport system is provided with a rail lever that is able to reduce or increase the width of the transport carriage to the width of a standard trolley. The rail lever moves a linkage, thereby simultaneously moving both sides of the transport carriage for a total of a maximum of 2.5 cm inward or outward. The rail lever with manual operation that operates the bar linkage for widening or narrowing the transport carriage can be replaced with an electric motor using gears and toothed belts or another mechanical device, such as a spindle mechanism.

The rail lever moves a guide cable via a gear. The guide cable runs first between the side outside wall and the side inside wall of the transport carriage, is then redirected by two cable guiding wheels and routed to the widening linkage. The widening linkage comprises a longitudinal metal rod and a plurality of transverse joints. The transverse joints are fastened to the longitudinal metal rod and to the side wall of the transport carriage so that they widen or narrow the transport carriage.

The hook mechanism located on the floor of the transport carriage connects the transport carriage to the cross-bar located at the end of the transport rail. Guide rails are located on the inner sides of the transport carriage, while rail wheels are located on the outer side of the transport carriage. After this mechanical connection process, the electric motor inside the transport carriage is started, which then retracts the transport rail, section after section, by a metal cable winch or by a toothed belt and gears.

The transport carriage preferably includes a plurality of profile rails for inserting the side walls. The side wall of the transport carriage is preferably coated with a plastic material and inserted in the profile rail. Advantageously, a side sail chamber is provided on the edge of the side wall. A side sail in a signal color is incorporated in the side sail chamber of the transport carriage that is released together with setting-up of the profiled rail and indicates the walkable part the staircase next to the rail alerting to an accident risk. When the transport rails are pushed, section by section simultaneously with the first part of the transport rail, a side guard and a plastic side sail in a signal color are taken along and upward from one side of the transport carriage to the uppermost edge of the step. This side guard and the side sail in a signal color indicate the actual width of the step to avoid an accident risk, if the free part of the steps of the staircase is to be used by other employees, thus preventing any tripping and stepping on the transport rail as well as falls on the staircase.

The side wall is also provided with a spindle that is inserted in a spindle tube. A cable guide is inserted in a cable chute of the side wall.

Preferably, a plurality of planes with dividers is formed in the floor of the transport carriage. A base plate for containers, for example trolleys, is provided on the top plane. The base plate includes two guide rails for the wheels of the trolleys. The guide rails serve as catch means relative to the trolleys having wheels and to prevent any excess movement of the trolleys during the conveyance of the transport carriage. The bottom plane holds a locking mechanism for the transport carriage and the transport plate of a sliding frame. The planes are installed, complete with connecting cover, relative to the next plane having a functional mechanism.

Preferably, a spindle tube with incorporated spindles is located to the left and to the right of the transport carriage, the wheels of the transport carriage being mounted in the lower section of the spindles with ball bearings, the spindle tubes being connected on the sides of the transport carriage by a cross-bar.

Advantageously, the transport carriage has a crank drive mechanism.

The present invention also relates to a method for conveying one or a plurality of containers for loading and/or unloading a galley of an aircraft. The method comprises at least the following steps:

starting and positioning a transport carriage, inside which there are stowed two profiled rails and a transport rail, at the bottom step of a staircase, the transport carriage being provided with at least one electric motor, the profiled rails each include a plurality of foldable or telescoping rail sections having a shaped profile, the transport rail including at least one electric motor and a plurality of foldable or telescoping rail sections;

setting up the two profiled rails on the staircase by moving the profiled rails upward at a larger angle than the angle of ascent of the staircase and bringing them to rest on the staircase at the end of installation process;

placing the transport rail on the profiled rail so that casters on the bottom of the transport rail move inside the profiled rails; and conveying the one or the plurality of containers that are loaded in the transport carriage by a sliding frame that includes at least a glide plate and a transport plate, the glide plate and the transport plate being connected by a hinge so they can be folded together, the transport plate being inserted into a slot at the bottom in the transport carriage and fastened, there being below the glide plate a plurality of casters that ensure a low-friction back and forth gliding action in the transport rail.

Any truck/lift truck box can retrofitted with the track transport system and the transport rail. According to the invention any and all loading and unloading processes are thus handled by the track transport system and the transport rail relative to loading and unloading operation in the truck/lift truck box.

A plurality of transport carriages that is loaded with a plurality of containers is disposed in the truck/lift truck box. A plurality of profiled rails as well as additional transport rails are installed, thus constructing two track transport systems for loading and/or unloading an aircraft, and two track transport systems for loading or unloading the truck/lift truck box, and two track transport systems for loading or unloading the truck/lift truck box changing to a second truck/lift truck box. The transport carriages are moved onto the track transport system for loading the aircraft by a switch for loading the aircraft. The transport carriages are preferably moved down from the track transport system for unloading the aircraft by a switch for unloading the aircraft, the loading of the loaded containers and the unloading of the empty containers taking place simultaneously. Preferably, a plurality of track transport systems is constructed in the truck/lift truck box for conveying the transport carriages in the truck/lift trucks boxes.

The present invention also relates to a system for loading and unloading the truck/lift truck box as well as for the simultaneous loading and/or unloading of a galley of an aircraft, wherein the system comprises at least the following components:

a truck with lift truck box inside which are a plurality of transport carriages each loaded with a containers;

two track transport systems with transport rails between the truck/lift truck box and the aircraft cabin, the two track transport systems each consisting of profiled rails and a transport rail, and wherein each track transport system is provided with a switch for moving the transport carriages upward and downward; and a plurality of track transport systems within the truck/lift truck box for conveying purposes inside the truck/lift truck box.

To be emphasized is the fact that the important advantages of the present invention provide for better working conditions for employees who are responsible for loading and unloading the trucks/lift trucks, or processes involved in the loading and unloading of an aircraft are improved such that a maximum of 4500 kg is no longer handled manually but automatically; also, further improvement results, due to optimal utilization of the holding space of the truck/lift truck box, thus fewer trips by the truck/lift truck box to improve the environmental balance sheet of the catering company as well as of the airlines because there occurs only short-time energy use by the aircraft power generator unit (APU) with running aircraft engines and continuous exhaust formation, and the length of the loading and unloading processes of the aircraft and other processes, as well as the loading and unloading processes of the truck/lift truck box per se are shortened even in the operating areas of the catering company. To be stressed is the fact that all parties involved in clearing an aircraft are able to find and implement overall new process conditions, due to the changes in the loading and unloading operation with regard to catering the aircraft, which is why they all realize advantages that translate to their own respective areas. Space conditions in parking positions, the duration of the overall processes, stationary-specific effects for all processes during the process of aircraft clearance and in-house structural changes at the catering companies trigger positive consequences in all process areas involved in aircraft clearing, regarding use of personnel, physical labor effort, stress situations during clearing, profitability for all process participants, etc.

DESCRIPTION OF THE DRAWINGS

FIG. 1 is a view of a "cart-in-cart" system;

FIG. 2 is a top view of a base plate in the transport carriage for trolleys;

FIG. 3 is a side view of the transport carriage;

FIG. 4-1 is a view of the side walls of the transport carriage;

FIG. 4-2 is a large-scale view of a detail of FIG. 4-1;

FIG. 5 is a view of the transport carriage with an installed transport rail and U-shaped rail;

FIG. 6-1 is a side view of the U-shaped rail;

FIG. 6-2 is a front view of the U-shaped rail with the transport rail;

FIG. 7 is a top view to the first plane of the underbody of the transport carriage;

FIG. 8-1 is a side view of the cable mechanism for widening or narrowing the width of the transport carriage;

FIG. 8-2 is a view of the pull cable with lever mechanism;

FIG. 9-1 is a top view of the cable mechanism for widening or narrowing the width of the transport carriage;

FIG. 9-2 is a large-scale view of a detail from FIG. 9-1;

FIG. 9-3 is a section through the underbody of the transport carriage taken along a line A-A in FIG. 9-1;

FIG. 9-4 is a large-scale view of a detail from FIG. 9-1;

FIG. 10-1 is a top view of the mechanism plane in the transport carriage for setting-up of the U-shaped rail;

FIG. 10-2 is a side view of the mechanism plane in the transport carriage for the mechanism of the U-shaped rail;

FIG. 13-1 is a view of the process steps for constructing the transport rail on the U-shaped rail;

FIG. 13-2 is a large-scale view of a detail from FIG. 13-1;

FIG. 14-1 is a view of a transport carriage loaded with two half trolleys and being conveyed upward on an extended transport rail;

FIG. 14-2 is a large-scale view of a detail from FIG. 14-2;

DETAILED DESCRIPTION

List of Reference Signs

Figures 1, 8:
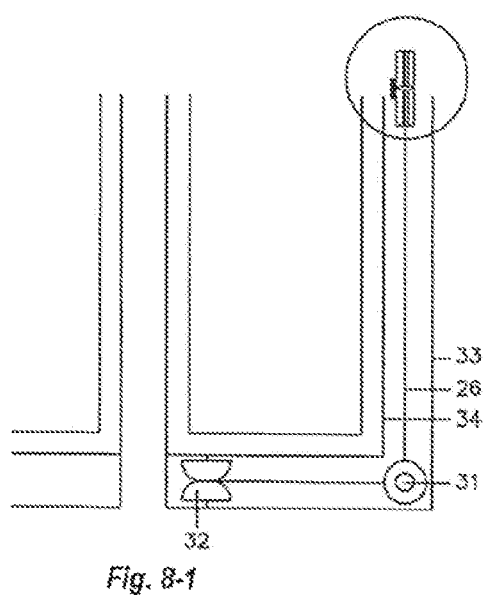

1 Trolley
2 Transport carriage
3 Base plate
4 Guide rails
5 Twin wheels of a trolley
6 Rail lever
7 Parking brake
8 Wheels of the transport carriage
9 U-shaped profile rail
10 Cable chute
11 Cable guide
12 Spindle tube
13 Spindle of the transport carriage
14 Folded U-shaped rail
15 Side wall of the transport carriage
16 Side sail chamber
17 Foldable transport rail
18 Toothed rail of the U-shaped rail
19 Wheel suspension
20 U-shaped rail
21 Casters of the section of the transport rail
22 Representation of the front view of the toothed rail under the U-shaped rail
23 Connecting bar
24 L-shaped angle
25 Section of the transport rail
26 Guide cable
27 U-shaped aluminum rails
28 Tube-in-tube connection with spring mechanism
29 Connecting joints
30 Spring container
31, 32 Cable guide wheels
33 Side outside wall of the transport carriage
34 Side inside wall of the transport carriage
35 Toothed belt connection to the motor for widening and narrowing the transport carriage
36 Gear on the outer side of the axis for widening and narrowing with motor
37 Mechanism plane in the floor of the transport carriage
38 Aluminum corner profile of the floor of the transport carriage
39 Fasteners
40 Eyelet for fastening the guide cable to the rail lever
41, 42 Transverse joints
43 Longitudinal metal bar
44 Spring
45 Cover of the spring container
46 Sections for the twin wheels of the transport carriage
47 Rail wheel of the transport carriage
48 Aluminum square tube for the stability of the transport rail
49 Guide plastic sleeve
50 Rivet insert
51 Leg of the rigid light alloy angle
52 Head of the rigid light alloy angle 53 Lens head screw with internal thread
54 Flat head screw
55 Side wall of the transport carriage
56 Light alloy angle
57 Electric motor
58 Toothed belt
59 Gear axis
60 Gears
61 Transport rail
62 Gear
63 Flat motor
64 Toothed belt
65 Ball bearing cylinder
66 Spindle
67 Transport carriage door
69 Guide rail wheels of the U-shaped rail
70 Ramp
71 Hinge
72 Half trolley
73 Transport plate
74 Glide plate
75 Rail path in the transport rail
76 Rail wheel for the removal and installation of the sliding frame
77 Caster of the transport carriage
78 Caster of the glide frame
79 Floor plate of the rail path
80 Rail path for the casters of the transport carriage
81 Axis for the casters and the rail wheels
82 Door on the transport carriage with ramp function
83 Top view of the cargo hold of a truck/lift truck box
84 Truck/transport carriage switch for loading an aircraft
85 Truck/transport carriage switch for unloading an aircraft
86 Track transport system between the truck and the aircraft cabin
86' Track transport system in the truck
87 Flexible middle part of the track transport system
88 Aircraft door
89 Aircraft cabin
90 Container removal location
91 Container loading location
92 Rail switch
93 Truck/transport carriage
94 Rail at the loading and unloading plane/bottom
T Staircase

EMBODIMENTS

Further advantages and details of the present invention have been illustrated based on the embodiments as shown in the drawings, which are in no way intended to limit the protective scope of the invention.

FIG. 1 shows a "cart-in-cart" system. A trolley 1 is pushed into the transport carriage 2 according to the invention via a ramp.

Figures 2, 8:
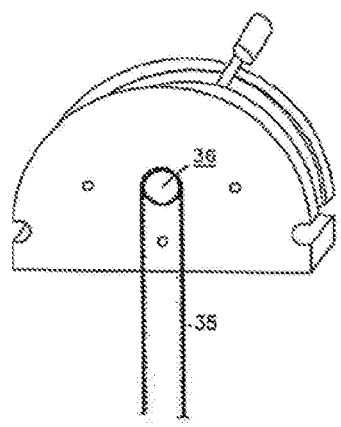

FIG. 2 is a top view of the base plate 3 in the transport carriage for containers such as, for example, trolleys. The base plate includes two guide rails 4 for the twin wheels 5 of the trolley. The guide rails 4 serve to confine the wheeled trolley and prevent any excess movement of the trolley during conveyance of the transport carriage.

Figures 1, 9:
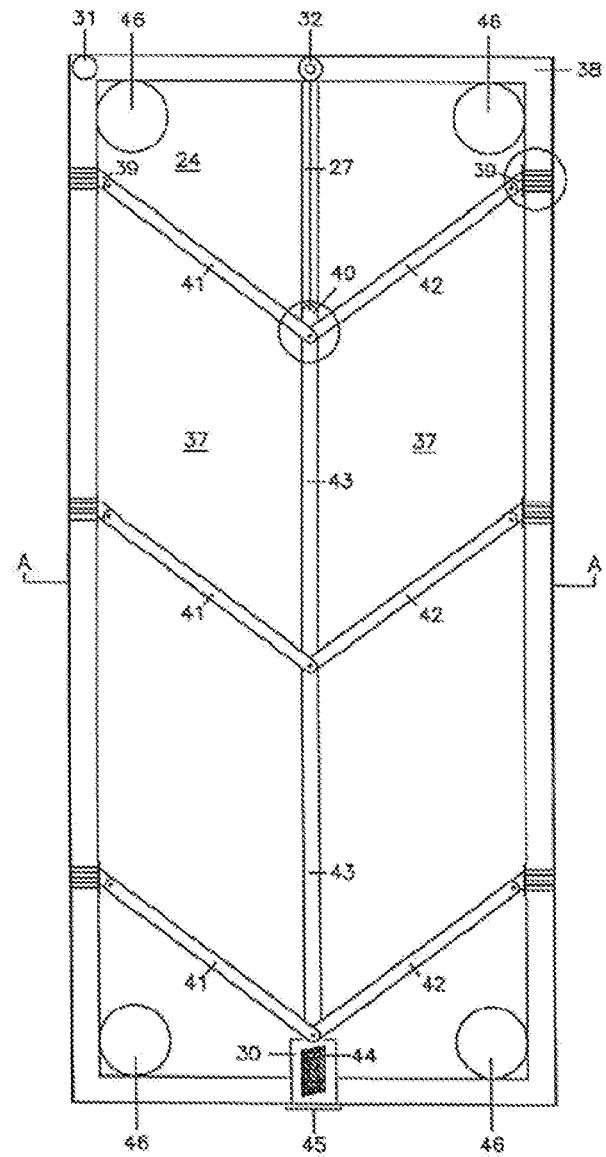
Figures 2, 9:
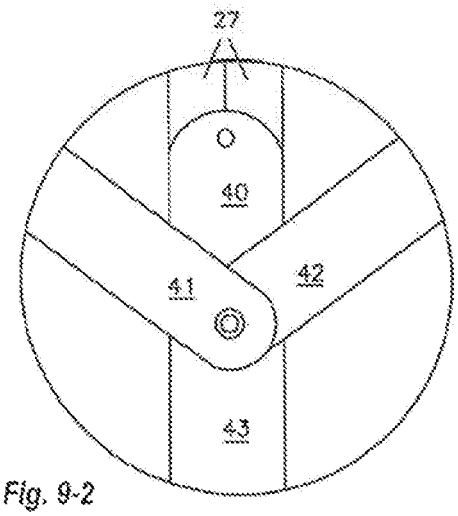
Figures 4, 9:
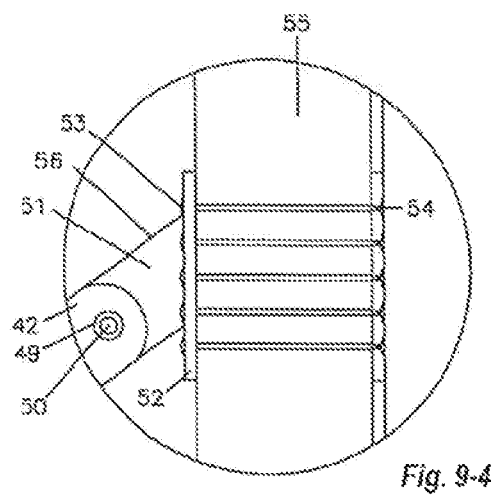
Figures 3, 9:
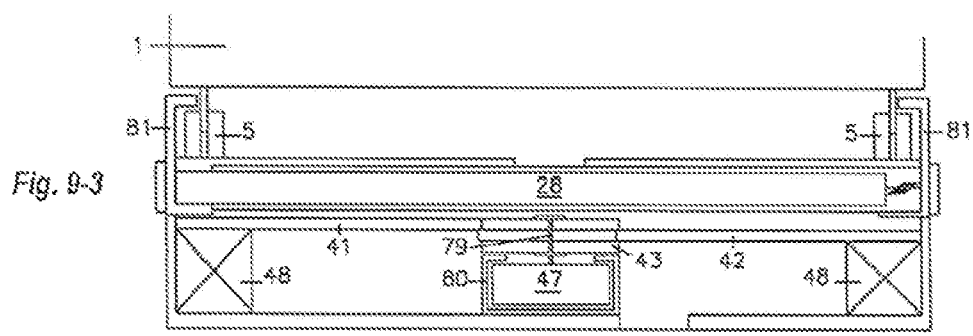

FIG. 3 is a side view of the transport carriage 2. The transport carriage 2 according to the invention is provided with a rail lever 6 that is able to increase or reduce the width of the transport carriage to match the width of a standard trolley. The rail lever simultaneously moves both sides of the transport carriage toward each other or away from each other, in total by a maximum of 2.5 cm. A parking brake 7 is provided for the wheels 8 below the transport carriage. The transport carriage includes a plurality of U-section rails 9 for inserting the side walls. The structure of the U-section rail 9 will be explained in further detail in FIG. 4 below.

FIG. 4-1 shows the side walls of the transport carriage. FIG. 4-2 (detail A) shows an enlargement of a detail from FIG. 4-1. The side wall 15 is preferably coated with plastic and inserted in the rails having the U-shaped profile 9. A lateral sail chamber 16 is on the edge of the side wall. A lateral sail (not shown) is incorporated in the lateral sail chamber of the transport carriage having a signal color; the sail is deployed when the U-shaped rail is erected and indicates the walkable part of the staircase next to the rail to avoid an accident risk. The side wall is also provided with a spindle 13 that is inserted in a spindle tube 12. A cable guide 11 is incorporated in a cable chute 10 of the side wall.

FIG. 5 shows the transport carriage 2 according to the invention with installed folded transport rail 17 and profiled rail 14 (in the present example, a U-shaped rail that is hereafter referred to as a U-rail).

FIG. 6-1 is a side view of the U-rail with a toothed rail 18 below the U-rail. FIG. 6-2 shows a front view of the U-rail 20 with a section 25 of the transport rail. A plurality of connecting bars 23 is provided between the two U-rails 20. The connecting bars 23 are respectively provided with two L-shaped angles 24 that position themselves against the edges of the staircase during the set-up of the U-rail. 22 is the front view of the toothed rail 18 below the U-rail 20.

The casters 21 of the section 25 glide in the U-rail and move the transport rail upward. The caster is connected to the section 25 by a wheel suspension 19.

FIG. 7 is a top view of the first plane of the underbody of the transport carriage. The guide cable 26 works with the lever mechanism. Two U-shaped aluminum rails 27 flank the guide cable 26. The guide mechanism with spring mechanism for widening and narrowing the transport carriage is located inside a plurality of tubes 28. A spring (not shown) is provided inside a spring container 30. A plurality of connecting joints 29 between the two U-shaped aluminum rails 27 serve for widening and narrowing the floor of the transport carriage.

FIG. 8-1 shows a side view of the cable mechanism for increasing or reducing the width of the transport carriage. The guide cable 26 first runs between the side outside wall 33 and the side inside wall 34 of the transport carriage and is then redirected by two cable guide wheels 31, 32, subsequently routed to the widening bar linkage. FIG. 8-2 (detail B) shows a cable winch with lever mechanism. Alternatively a gear 36 on the outer side of the axis as well as a toothed belt 35 widen or narrow. The gear is connected to the motor of the transport carriage in order to allow for widening and/or narrowing the transport carriage utilizing electrical means.

FIG. 9-1 shows a detailed top view of the cable mechanism for increasing or reducing the width of the transport carriage. The mechanism plane in the floor of the transport carriage 37, which is provided with an aluminum corner profile 38, divides during a widening operation. The guide cable (not shown here) is redirected to the widening linkage by two cable guide wheels 31, 32. The guide cable is fastened via an eye 40 to the rail lever. Here there are two U-aluminum rails 27. A plurality of metal bands made up of two cross joints 41, 42 are each mounted by two fasteners 39 to the side walls of the transport carriage. The transverse joints 41, 42 widen or narrow the transport carriage and are mounted to a longitudinal metal bar 43. A spring 44 is located inside a spring container 30 that is provided with a cover 45. When the transport carriage is reduced in size, the spring 44 relaxes. When the transport carriage is widened, the spring 44 is loaded. The twin wheels of the transport carriage are located in sections 46.

FIG. 9-2 is an enlargement of a detail from FIG. 9-1 and shows the mounting location 40 on the longitudinal bar 43 for the guide cable 26 that is connected to the lever. Transverse joints 41, 42 are mounted to the longitudinal bar 43. FIG. 9-4 shows in detail the fasteners for the transverse joint 42 on the side wall 55 of the transport carriage. The end of the transverse joint 42 is provided with an opening for a guide plastic sleeve 49 intended for the rivet 50 that connects the transverse joint 42 to the leg 51 of the rigid light alloy angle 56 that also has an opening for the rivets. The head 52 of the rigid light alloy angle is provided with a plurality of openings. One flat-head screw 53 with internal thread can be inserted respectively in each of the openings. On the other side of the side wall, each flat-head screw is screwed together with a flat head screw 54, by way of which the light alloy angle and thus the transverse joint can be fastened to the side wall 15.

FIG. 9-3 is a representation of a cross-section along line A-A in FIG. 9-1. The rail wheel 47 of the transport carriage that moves in a rail path 80 supports the linkage (transverse joints 41, 42, longitudinal metal bar 43) ensuring that the same do not bend during operation thereof. Correspondingly, it is possible to use light-weight materials, such as, for example, aluminum, for manufacturing the bar linkage. The two square aluminum tubes 48 serve to ensure the stability of the entire mechanism.

Figures 1, 10:
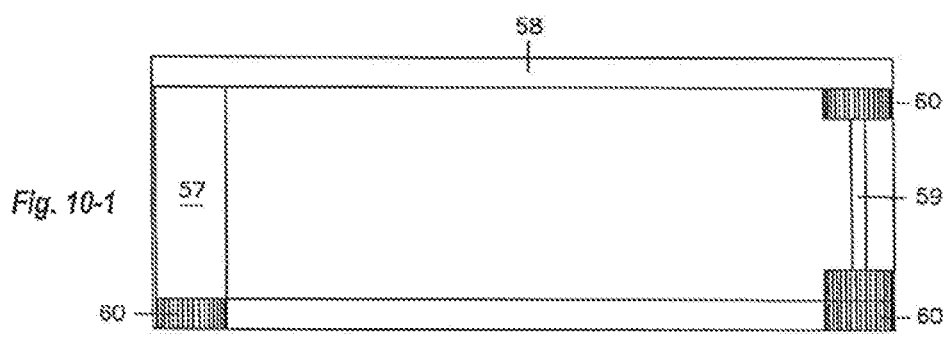
Figures 2, 10:
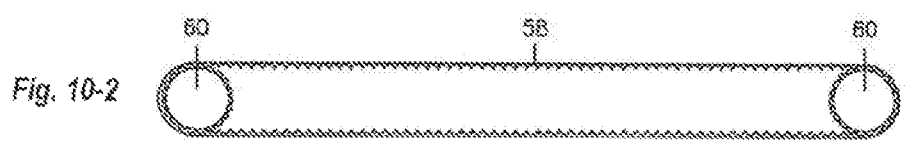

FIG. 10-1 is a top view of the mechanism plane in the transport carriage for setting up the U-rail, while FIG. 10-2 shows a side view of the mechanism plane in the transport carriage for setting up the U rail. Located on the underside of each U-rail is a toothed rail (not shown). The gears 60 are pivotally mounted under the toothed rail. These gears 60 are connected to the electric motor 57 via a toothed belt 58. 59 is a gear axis.

Figure 11:
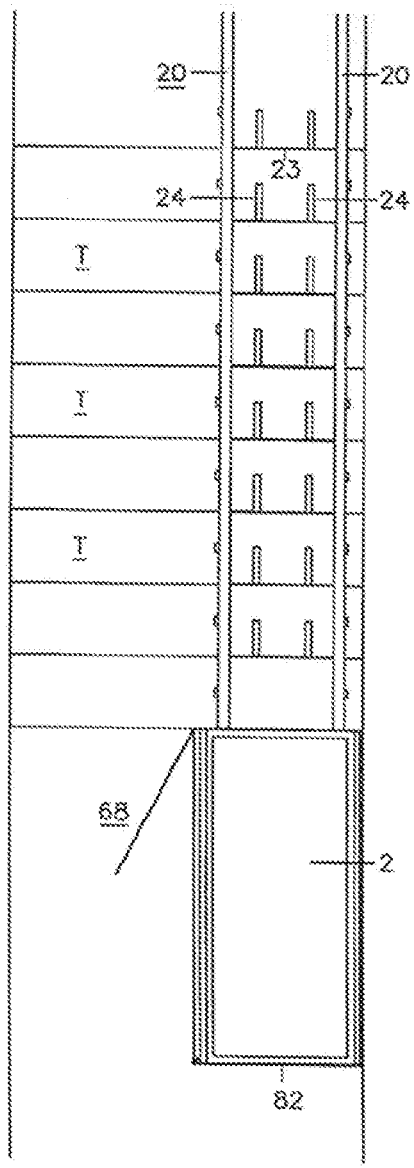
FIG. 11 is a view of setup steps of the U-shaped rail.

FIG. 11 shows the constructive set-up process of the U-rail. The transport carriage 2 is moved to the staircase 61. The U-rail 20 is laid out on the staircase T. A plurality of connecting rods 23 are provided between the two U-rails 20. The connecting rods 23 are each provided with two L-shaped angles 24 that come to rest on the edges of the staircase during setting-up of the U-rail.

Figure 12:
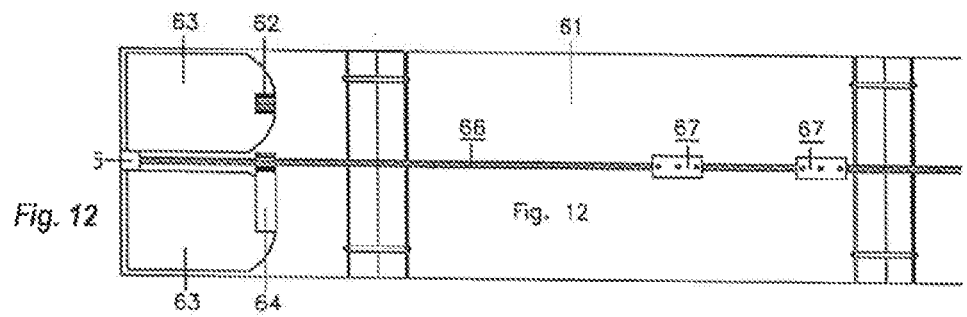
FIG. 12 is a view of the drive for the sliding frame.
Figures 2, 13:
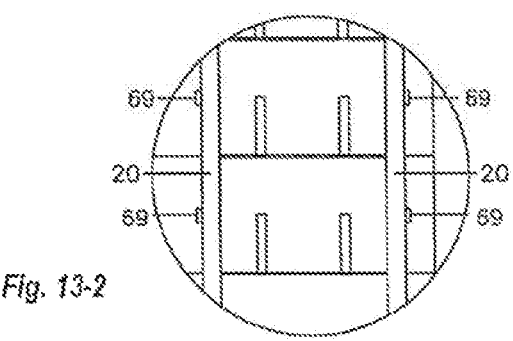

FIG. 12 shows the guide mechanism of the rail wheels with rails. Two flat motors 63 are located on the laid out transport rail 61 that power a gear 62 and a toothed belt 64. The toothed belt 64 rotates a spindle 66 that is supported inside a ball bearing cylinder 65. A plurality of spindle bearings 67 with fastening device for the sliding fame (not shown) are provided along the spindle 66.

Figures 1, 13:
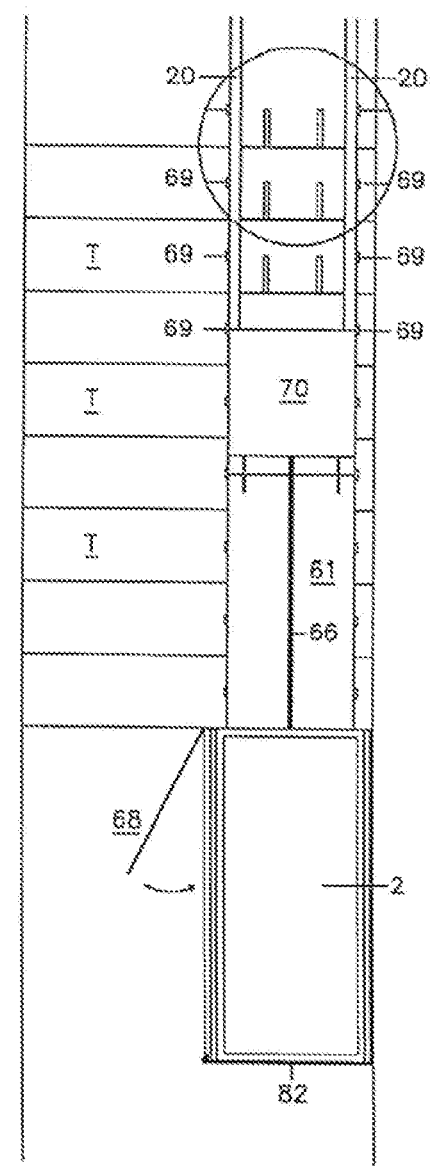

FIG. 13-1 shows the course of the set-up of the transport rail on the U-rail. The transport carriage 2 according to the invention is moved in position at the bottom step of the staircase. The transport carriage door 68 is located on one side of the transport carriage. The U-rail 20 is first placed on the staircase T. The guide rail wheels 69 of the U-rail allow the U-rail to run inside the transport carriage. The transport rail 61 is directed upward inside the U-rail by the casters (see FIG. 6-2). A ramp 70 is connected to the top section by a hinge, thus allowing loading and unloading containers. FIG. 13-2 is an enlarged detail from FIG. 13-1.

Figures 1, 14:
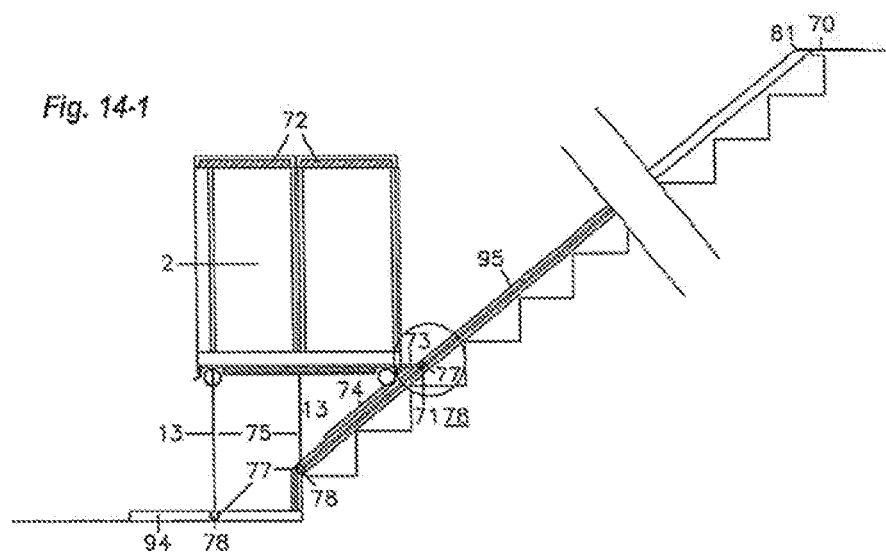
Figures 2, 14:
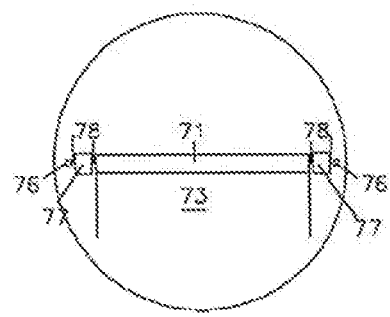

FIG. 14-1 shows a transport carriage 2 loaded with two half trolleys 72 and being conveyed upward on the laid out transport rail. The bottom plane of the underbody of the transport carriage has an area for inserting the transport plate 73 of the sliding frame. The transport plate 73 is connected to the glide plate 74 by a hinge 71 (see FIG. 14-2). The glide plate can be powered by the conveying mechanism in the transport rail by the gear and toothed belt mechanism for movement on the transport rails. Spindle tubes with incorporated spindles 13 are provided in the transport carriage. The spindles 13 are connected to each other by a spindle cross-connection (not shown) in order to improve the stability of the transport carriage during the conveyance of the containers. Located on the bottom part of each of the spindles is a caster 77 with ball bearing. These spindles rotate automatically in order to support the load of the transport carriage with containers as well as the weight of the transport plate of the sliding frame, while, simultaneously, the transport plate is transported in the 3-degree angle relative to the plane of the loading and unloading station. The twin wheels of the transport carriage move inside the rail path in the transport rail 75. The rail on the bottom loading and unloading plane 94 is visible.

FIG. 14-2 is a view of an enlarged detail from FIG. 14-1. The hinge 71 that connects the transport plate 73 and the glide plate 74 in FIG. 14-1 can be seen. A metal bar is pulled through the hinge (not shown) at the end of which there are disposed double casters 78 on the right and left sides that move during the back and forth gliding action in a rail in the transport rail. The rail wheels 76 for the assembly and disassembly of the sliding frame as well as axis 81 for the casters are visible.

Figure 15:
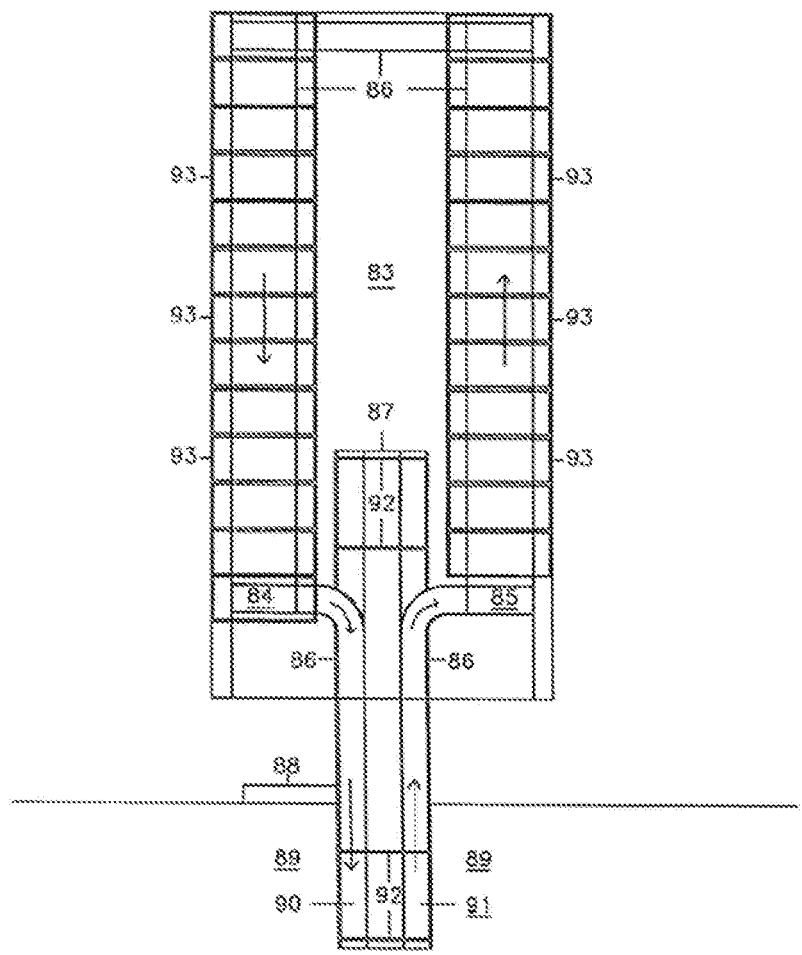
FIG. 15 is a view of the transit process, truck/lift truck box and aircraft cabin utilizing the track transport system.

FIG. 15 represents a cabin during transit. The transport rail according to the invention is a suitable device for retrofitting any truck/lift truck box. A plurality of truck transport carriages 93 that are loaded with containers are disposed in the truck/lift truck box 83. Four U-section rails and two transport rails are laid out between the truck/lift truck box 83 and the cabin of the aircraft 89, two track transport systems 86 being set up for loading and/or unloading an aircraft with the loading action of the loaded containers and the unloading of the empty containers being carried out simultaneously. The transport carriages 93 are moved upward via the truck/transport carriage switch 84 for the loading action on the first track transport system 86 between the truck and aircraft cabin. The loaded containers are removed at the removal location 90. The transport carriages 93 are reloaded with empty containers at the loading location of the containers 91 and move on the second track transport system 86 between the truck and the aircraft cabin. They then travel downward via the truck/transport carriage switch 85 from the track transport system for unloading the aircraft. A plurality of track transport systems 86 1 is set up in the truck, producing a circulatory movement of the transport carriages. The middle part 87 of the two track transport systems 86 is flexible so as to allow the track transport systems to be used on the rear of the truck for loading and unloading the truck.

I claim:

1. A track transport system comprising a transport carriage adapted to accept and to contain an associated carriage, the transport carriage comprising:
   two shaped-profile rails engaged with the transport carriage;
   a base plate having at least two guide rails, the guide rails being adapted to limit the movement of the associated carriage by confining twin wheels thereof;
   side walls inserted into the shaped-profile rails, the side walls including a first elongated side wall and a second elongated side wall parallel to and offset from the first elongated side wall, each side wall having
a lateral sail chamber,
a cable chute incorporating a cable guide therein,
a spindle displaced within a spindle tube,
wheels operationally engaged with the transport carriage and adapted for rolling transport of the transport carriage, and operationally engaged with a parking brake;
a first assembly having:
a first elongated profile rail engaged with a first elongated toothed track,
a second elongated profile rail engaged with a second elongated toothed rail wherein the first and second elongated profile rails are connected by a plurality of laterally extending connecting bars,
an L-shaped angle engaged across the connecting bars,
a transport track slidably engaged with the first elongated profile rail and the second elongated profile rail through a first wheel suspension with a first caster, the first caster being movably engaged with the first elongated profile rail, and a second wheel suspension with a second caster, the second caster being movably engaged with the second elongated profile rail; and
a second assembly adapted to modify the transport carriage width including:
the first side wall,
the second side wall,
a first elongated transverse joint,
a second elongated transverse joint,
a third elongated transverse joint, and
a fourth elongated transverse joint,
wherein the first elongated transverse joint, the first side wall, the second elongated transverse joint, and a first elongated longitudinal bar are operationally engaged to form a first parallelogram linkage, and wherein the third elongated transverse joint, the second side wall, the fourth elongated transverse joint, and the first elongated longitudinal bar are operationally engaged to form a second parallelogram linkage.

2. The track transport system of claim 1 wherein at least two transport carriages are setup within a truck box and can be moved by means of said track transports system within the truck box.

3. The track transport system of claim 2 wherein the track transport system is adapted for use in loading or unloading the galley of an aircraft, wherein the galley comprises at least one transport carriage, and wherein the track transport system for loading or unloading the galley of the aircraft further comprises:
the truck box containing at least one transport carriage, wherein each transport carriage is adapted to be loaded with containers;
two track transport systems between the truck box and the aircraft cabin, wherein the two track transport systems each comprise two shaped-profile rails and a transport rail, and wherein each track transport system further comprises a switch for driving up and driving down the transport carriages; and
at least one track transport system within the truck box for transporting the transport carriages within the truck box.

4. The track transport system of claim 1 wherein the track transport system is adapted for use in loading or unloading the galley of an aircraft, wherein the galley comprises at least one transport carriage, and wherein the track transport system for loading or unloading the galley of the aircraft further comprises:
a truck box containing at least one transport carriage, wherein each transport carriage is adapted to be loaded with containers;
two track transport systems between the truck box and the aircraft cabin, wherein the two track transport systems each comprise two shaped-profile rails and a transport rail, and wherein each track transport system further comprises a switch for driving up and driving down the transport carriages; and
at least one track transport system within the truck box for transporting the transport carriages within the truck box.

* * * * *